(12) United States Patent
Ogishi et al.

(10) Patent No.: US 7,010,592 B2
(45) Date of Patent: Mar. 7, 2006

(54) METHOD FOR COLLECTING STATISTICAL TRAFFIC DATA

(75) Inventors: Tomohiko Ogishi, Tokyo (JP); Akira Idoue, Toda (JP); Toru Hasegawa, Shiki (JP); Toshihiko Kato, Asaka (JP)

(73) Assignee: DDI Corporation, Tokyo (JP)

( * ) Notice: Subject to any disclaimer, the term of this patent is extended or adjusted under 35 U.S.C. 154(b) by 768 days.

(21) Appl. No.: 09/820,008

(22) Filed: Mar. 29, 2001

(65) Prior Publication Data

US 2001/0027485 A1    Oct. 4, 2001

(30) Foreign Application Priority Data

Mar. 29, 2000    (JP)    ............................. 2000-090661

(51) Int. Cl.
*G06F 15/173*    (2006.01)

(52) U.S. Cl. ...................................... 709/224; 709/229

(58) Field of Classification Search ................ 709/203, 709/229, 224–226, 238, 234–237; 370/389, 370/342, 466, 352, 234–236, 230; 725/16; 714/752; 375/225; 713/201; 718/205

See application file for complete search history.

(56) References Cited

U.S. PATENT DOCUMENTS

| | | | | |
|---|---|---|---|---|
| 4,652,915 | A * | 3/1987 | Heller, III ..................... | 725/16 |
| 5,444,849 | A * | 8/1995 | Farrand et al. .............. | 709/237 |
| 5,802,106 | A * | 9/1998 | Packer ........................ | 375/225 |
| 6,091,710 | A * | 7/2000 | Mawhinney ................. | 370/236 |
| 6,178,450 | B1 * | 1/2001 | Ogishi et al. ............... | 709/224 |
| 6,182,139 | B1 * | 1/2001 | Brendel ...................... | 709/226 |
| 6,201,791 | B1 * | 3/2001 | Bournas ..................... | 370/234 |
| 6,219,706 | B1 * | 4/2001 | Fan et al. .................... | 709/225 |
| 6,269,099 | B1 * | 7/2001 | Borella et al. .............. | 370/389 |
| 6,411,986 | B1 * | 6/2002 | Susai et al. ................. | 709/203 |
| 6,427,169 | B1 * | 7/2002 | Elzur ......................... | 709/224 |
| 6,427,173 | B1 * | 7/2002 | Boucher et al. ............ | 709/238 |
| 6,449,266 | B1 * | 9/2002 | Hottinen et al. ............ | 370/342 |
| 6,560,630 | B1 * | 5/2003 | Vepa et al. ................. | 718/105 |
| 6,587,435 | B1 * | 7/2003 | Miyake et al. .............. | 370/236 |
| 6,625,166 | B1 * | 9/2003 | Tsukamoto et al. ......... | 370/466 |

(Continued)

FOREIGN PATENT DOCUMENTS

JP    11-252111 A    9/1999

OTHER PUBLICATIONS

Identifying the TCP Behavior of Web Servers—Padhye, Floyd (2000); www.aciri.org/floyd/../tbit/tbit.ps.*

(Continued)

*Primary Examiner*—Andrew Caldwell
*Assistant Examiner*—Thong Vu
(74) *Attorney, Agent, or Firm*—Birch, Stewart, Kolasch & Birch, LLP.

(57) ABSTRACT

As shown in FIG. 2, when the SYN segment is detected, the amount of transmitted segment from the side which sent the detected SYN segment is obtained by counting the continuously detected DATA segments for collecting the traffic in a certain direction where it is impossible to directly capture the traffic. Further, the amount [ini_sdt] of the transmitted bytes from the side which sent the detected SYN segment is obtained by calculating the equation [ini_sdt]= [SEQn+LENn]−[SEQ1]. Wherein, [SEQ1] is the sequence number of the first detected DATA segment, [SEQn] is the sequence number of the last detected DATA segment and [LENn] is the user data length of the last detected DATA segment.

12 Claims, 9 Drawing Sheets

U.S. PATENT DOCUMENTS

| | | | | |
|---|---|---|---|---|
| 6,650,636 B1 * | 11/2003 | Bradshaw et al. | ........... | 370/352 |
| 6,654,923 B1 * | 11/2003 | Grenier et al. | ............... | 714/752 |
| 6,691,165 B1 * | 2/2004 | Bruck et al. | ................. | 709/227 |
| 6,711,137 B1 * | 3/2004 | Klassen et al. | ............. | 370/252 |
| 6,728,885 B1 * | 4/2004 | Taylor et al. | ................ | 713/201 |
| 6,757,255 B1 * | 6/2004 | Aoki et al. | .................. | 370/252 |
| 6,907,042 B1 * | 6/2005 | Oguchi | ........................ | 370/412 |
| 6,925,060 B1 * | 8/2005 | Mangin | ....................... | 370/237 |

OTHER PUBLICATIONS

Measuring the Capacity of a Web Server—Banga, Druschel (1997); www.cs.rice.edu/~gaurav/papers/web-paper.ps.*

Webcard: a Java Card web server—Rees, Honeyman (1999); www.citi.umich.edu/techreports/reports/citi-tr-99-3.ps.gz.*

Is the Round-trip Time Correlated with the Number of Packets . . . —Biaz, Vaidya (1999); www.cs.tamu.edu/people/saadb/tech99-006.ps.*

TCP/IP Security; www.linuxsecurity.com/resource_files/documentation/tcpip-security.html.*

The Potential for Using Thread-Level Data Speculation to . . . —Gregory Steffan (1998);www.cs.cmu.edu/~tcm/tcm_papers/tlds_hpca4.ps.gz.*

Practical Dependence Testing—Golf, Kennedy, Tseng (1991); softlib.rice.edu/pub/CRPC-TRs/reports/CRPC-TR90103-S.ps.gz.*

A Predictability Analysis of Network Traffic—Sang, Li (2000) www.ieee-infocom.org/2000/papers/47.ps.*

Buffering vs. smoothing for end-to-end QoS: Fundamental issues . . . —Wu, Knightly (1999) www-ece.rice.edu/networks/papers/WuKni99.ps.gz.*

Resource Management in Wide-Area ATM Networks using . . . —de Veciana, Kesidis . . . (1995) odysseus.unwaterloo.ca/~kesidis/JSAC.ps.*

* cited by examiner

AMOUNT of RE-TRANSMITTED DATA
from SYN SENDING SIDE or
SYN+ACK SENDING SIDE

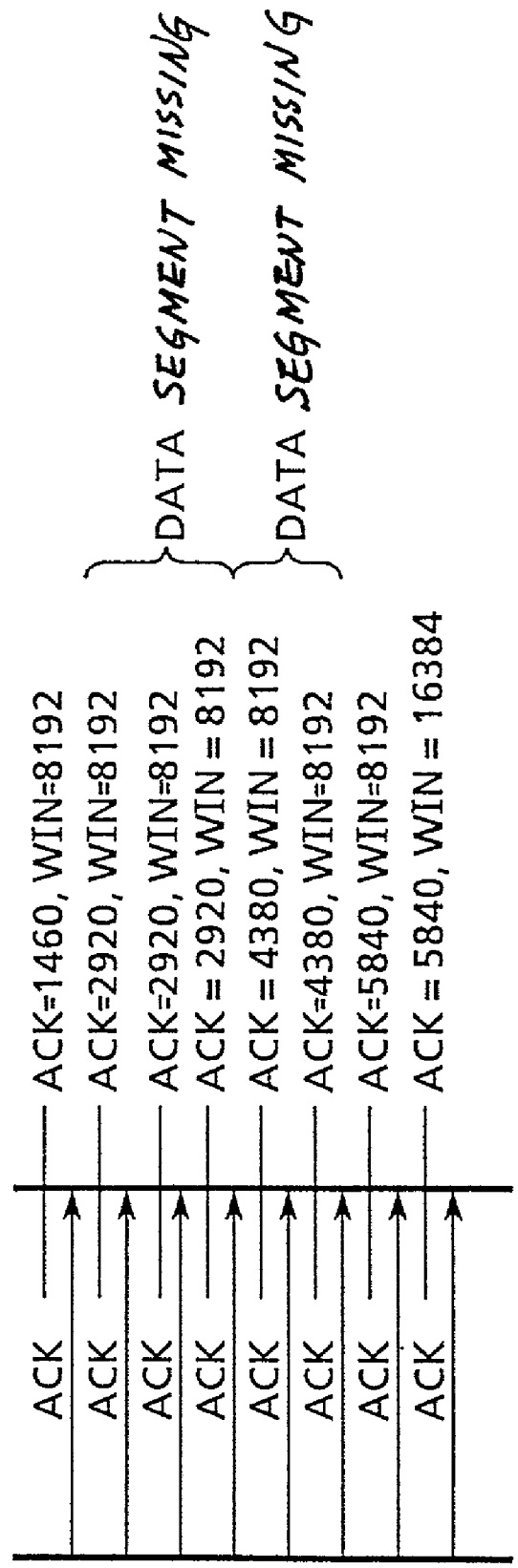

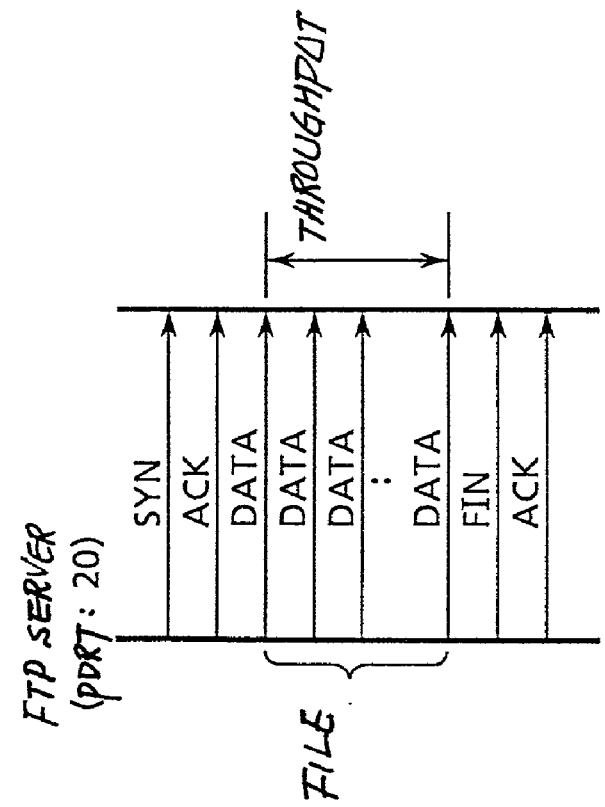
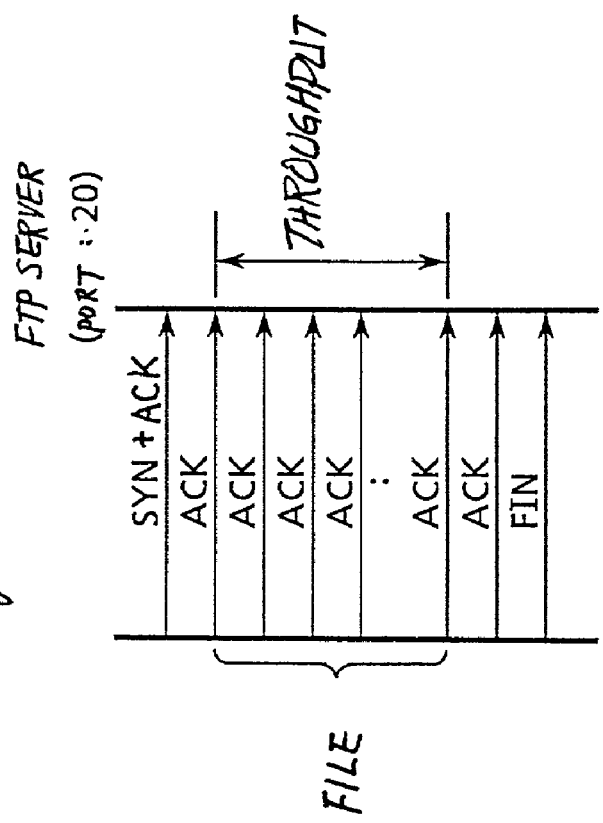

METHOD FOR COLLECTING STATISTICAL TRAFFIC DATA

The entire disclosure of Japanese Patent Application No. 2000-90661 filed on Mar. 29, 2000 including specification, claims, drawings and summary is incorporated herein by reference in its entirety.

FIELD OF THE INVENTION

The present invention relates to a technique for collecting or gathering statistical traffic data by capturing a TCP/IP traffic which flows on the Internet line. Specially, the present invention enables to collecting, by managing a TCP-level information in a certain direction, a traffic in another direction where it is impossible to directly capture the traffic.

BACKGROUND OF THE INVENTION

A performance analysis, which measures such statistical traffic data as an amount of transferred data, becomes important according to a spread of the Internet. As described in Japanese Patent laid-open Application No. 11-252111, the inventors considered that it was possible to recognise a situation of the Internet by measuring a TCP-level statistical information (for example, an amount of re-transferred data, a waiting time for establishing a connection etc.), then developed a traffic monitor which can collect the TCP-level statistical traffic information in addition to an IP-level information by monitoring a backbone line of the Internet. The traffic monitor was developed under such a condition that it was possible to monitor segments of both directions in a TCP communication on the same line.

However, as an IP routing is controlled according to each direction, there is a case that traffics of both directions do not flow on the same line. Namely, because it can be considered that a going route and a return route are different each other in a real network configuration, there is a case that traffics of both direction can not be captured.

It is known the MRTG technique for collecting IP-level statistical traffic information such as an amount of segments per a unit time or an amount of bytes per a unit time respectively in a router. Further, it is known the SNIFFER technique for collecting TCP-level statistical traffic information such as an amount of segments or an amount of bytes respectively at every application in addition to the IP-level statistical traffic information. However, each technique has a condition that it is possible to monitor segments of both direction in the TCP communication on the same line.

An object of the present invention provides a method for collecting, by managing the TCP-level information in a certain direction, at least a traffic in another direction where it is impossible to directly capture the traffic.

SUMMARY OF THE INVENTION

A method derived from the preferred embodiment comprises steps of:
  detecting an SYN segment from a traffic in one of two directions on the Internet line;
  detecting a DATA segment, which belongs to the same connection as the detected SYN segment, from said traffic; and
  obtaining at least one of an amount of transmitted segment from a side which sent the detected SYN segment, and an amount of transmitted bytes from said side; wherein said amount of transmitted segment being obtained by counting a total amount of said detected DATA segment, and said amount of transmitted bytes being obtained by calculating a difference between a sequence number of the first detected DATA segment, and a sum of a sequence number of the last detected DATA segment and a user data length of said last detected DATA segment.

Another method derived from the preferred embodiment comprises steps of:
  detecting an SYN+ACK segment from a traffic in one of two directions on the Internet line;
  detecting a DATA segment, which belongs to the same connection as the detected SYN+ACK segment, from said traffic; and
  obtaining at least one of an amount of transmitted segment from a side which sent the detected SYN+ACK segment, and an amount of transmitted bytes at said side; wherein said amount of transmitted segment being obtained by counting a total amount of said detected DATA segment, and said amount of transmitted bytes being obtained by calculating a difference between a sequence number of the first detected DATA segment, and a sum of a sequence number of the last detected DATA segment and a user data length of said last detected DATA segment.

Another method derived from the preferred embodiment comprises steps of:
  detecting an SYN segment from a traffic in one of two directions on the Internet line;
  detecting an ACK segment and a DATA segment, each of which belongs to the same connection as the detected SYN segment, from said traffic; and
  calculating, as an amount of received data at a side which sent the detected SYN segment, a difference between an acknowledgment number of the first detected ACK segment or DATA segment and an acknowledgement number of the last detected ACK segment or DATA segment.

Another method derived from the preferred embodiment comprises steps of:
  detecting an SYN+ACK segment from a traffic in one of two directions on the Internet line;
  detecting an ACK segment and a DATA segment, each of which belongs to the same connection as the detected SYN+ACK segment, from said traffic; and
  calculating, as an amount of received data at a side which sent the detected SYN+ACK segment, a difference between an acknowledgment number of the first detected ACK segment or DATA segment and an acknowledgement number of the last detected ACK segment or DATA segment.

Another method derived from the preferred embodiment comprises steps of:
  detecting an SYN segment from a traffic in one of two directions on the Internet line;
  detecting a DATA segment, which belongs to the same connection as the detected SYN segment, from said traffic;
  determining a sequence number of a DATA segment to be sent next, at every detection of the DATA segment, based on a sequence number of the detected DATA segment;
  judging, at every detection of the DATA segment, whether a sequence number of the newly detected DATA segment is less than said determined sequence number at the last DATA segment detection; and obtaining, when the sequence number of the newly detected DATA segment is less than said determined sequence number, at least one of a new amount of re-transmitted segment at a side which sent the detected SYN segment, and a new amount of re-transmitted bytes at said side; wherein said new amount of re-transmitted segment being obtained by adding 1 to the last obtained amount of re-transmitted segment, and said new amount of re-transmitted bytes being obtained by adding a smaller one out of a first value and a second value to the last obtained amount of re-transmitted segment, wherein the first value being a difference between said determined sequence number and a sequence number of said newly detected DATA segment, and the second value being a user data length of said newly detected DATA segment.

Another method derived from the preferred embodiment comprises steps of:

detecting an SYN+ACK segment from a traffic in one of two directions on the Internet line;

detecting a DATA segment, which belongs to the same connection as the detected SYN+ACK segment, from said traffic;

determining a sequence number of a DATA segment to be sent next, at every detection of the DATA segment, based on a sequence number of the detected DATA segment;

judging, at every detection of the DATA segment, whether a sequence number of the newly detected DATA segment is less than said determined sequence number at the last DATA segment detection; and obtaining, when the sequence number of the newly detected DATA segment is less than said determined sequence number, at least one of a new amount of re-transmitted segment at a side which sent the detected SYN+ACK segment, and a new amount of re-transmitted bytes at said side; wherein said new amount of re-transmitted segment being obtained by adding 1 to the last obtained amount of re-transmitted segment, and said new amount of re-transmitted bytes being obtained by adding a smaller one out of a first value and a second value to the last obtained amount of re-transmitted segment, wherein the first value being a difference between said determined sequence number and a sequence number of said newly detected DATA segment, and the second value being a user data length of said newly detected DATA segment.

Another method derived from the preferred embodiment comprises steps of:

detecting an SYN segment from a traffic in one of two directions on the Internet line;

detecting an ACK segment, which belongs to the same connection as the detected SYN segment, from said traffic;

determining an acknowledgment number of an ACK segment to be sent next and a window size of an ACK segment having the maximum acknowledgment number, at every detection of the ACK segment, based on an acknowledgment number of the detected ACK segment;

judging, at every detection of the ACK segment, whether both of an acknowledgment number and a window size of the newly detected ACK segment are equal to said determined acknowledgment number and said determined window size at the last ACK segment detection; and obtaining, when both of the acknowledgment number and the window size of the newly detected two or more ACK segments are equal to said determined acknowledgment number and said determined window size, a new amount of missing DATA segment at a side which sent the detected SYN segments, by adding 1 to the last obtained amount of missing DATA segment.

Another method derived from the preferred embodiment comprises steps of:

detecting an SYN+ACK segment from a traffic in one of two directions on the Internet line;

detecting an ACK segment, which belongs to the same connection as the detected SYN+ACK segment, from said traffic;

determining an acknowledgment number of an ACK segment to be sent next and a window size of an ACK segment having the maximum acknowledgment number, at every detection of the ACK segment, based on an acknowledgment number of the detected ACK segment;

judging, at every detection of the ACK segment, whether both of an acknowledgment number and a window size of the newly detected ACK segment are equal to said determined acknowledgment number and said determined window size at the last ACK segment detection; and obtaining, when both of the acknowledgment number and the window size of the newly detected two or more ACK segments are equal to said determined acknowledgment number and said determined window size, a new amount of missing DATA segment at a side which sent the detected SYN+ACK segments, by adding 1 to the last obtained amount of missing DATA segment.

Another method derived from the preferred embodiment comprises steps of:

detecting an SYN segment from a traffic in one of two directions on the Internet line;

detecting continuous plural DATA segments and continuous plural ACK segments in succession to the DATA segments, all of which belong to the same connection as the detected SYN segment, from said traffic; and obtaining at least one of an HTTP response time at a side which sent the detected SYN segment, and an HTTP throughput at said side; wherein said HTTP response time being obtained by calculating a time difference from the last detection of the DATA segment to the first detection of the ACK segment, and said HTTP throughput being obtained by calculating a ratio of a difference, between an acknowledgement number of the first detected ACK segment and an acknowledgement number of the last detected ACK segment, to a time difference from the first detection of the ACK segment to the last detection of the ACK segment.

In the method, it is possible to efficiently avoid an extraordinary amount by calculating the HTTP throughput only when the continuous ACK segments than a predetermined quantity such as 10 are detected.

Another method derived from the preferred embodiment comprises steps of:

detecting an SYN+ACK segment from a traffic in one of two directions on the Internet line;

detecting continuous plural ACK segments and continuous plural DATA segments in succession to the ACK segments, all of which belong to the same connection as the detected SYN+ACK segment, from said traffic; and obtaining at least one of an HTTP response time at a side which sent the detected SYN+ACK segment, and an HTTP throughput at said side; wherein said HTTP response time being obtained by calculating a time difference from the last detection of the ACK segment to the first detection of the DATA segment, and said HTTP throughput being obtained by calculating a ratio of a difference, between a sequence number of the first detected DATA segment and a sum of a sequence number of the last detected DATA segment and a user data length of the last detected DATA segment, to a time difference from the first detection of the DATA segment to the last detection of the DATA segment.

In the method, it is possible to efficiently avoid an extraordinary amount by calculating the HTTP throughput only when the continuous ACK segments than a predetermined quantity such as 10 are detected.

Another method derived from the preferred embodiment comprises steps of:

detecting an SYN+ACK segment from a traffic in one of two directions on the Internet line;

detecting continuous plural ACK segments, which belong to the same connection as the detected SYN+ACK segment, from said traffic; and calculating, as an FTP throughput at a side which sent the detected SYN+ACK segment, a ratio of a difference, between an acknowledgement number of the first detected ACK segment and an acknowledgement number of the last detected ACK segment, to a time difference from the first detection of the ACK segment to the last detection of the ACK segment.

In the method, it is possible to efficiently avoid an extraordinary amount by calculating the FTP throughput only when the continuous ACK segments than a predetermined quantity such as 10 are detected.

Another method derived from the preferred embodiment comprises steps of:

detecting an SYN segment from a traffic in one of two directions on the Internet line;

detecting continuous plural DATA segments, which belong to the same connection as the detected SYN segment, from said traffic; and calculating, as an FTP throughput at a side which sent the detected SYN segment, a ratio of a difference, between a sequence number of the first detected DATA segment and a sum of a sequence number of the last detected DATA segment and a user data length of the last detected DATA segment, to a time difference from the first detection of the DATA segment to the last detection of the DATA segment.

In the method, it is possible to efficiently avoid an extraordinary amount by calculating the FTP throughput only when the continuous DATA segments than a predetermined quantity such as 10 are detected.

BRIEF DESCRIPTION OF THE DRAWINGS

FIG. 7 shows a sample of the sequence chart for collecting the amount of the missing segment.

FIG. 9(a) shows a sample of the sequence chart for collecting the FTP throughput.

FIG. 9(b) shows a sample of the sequence chart for collecting the FTP throughput.

DETAILED DESCRIPTION OF THE PREFERRED EMBODIMENT

Figure 1:
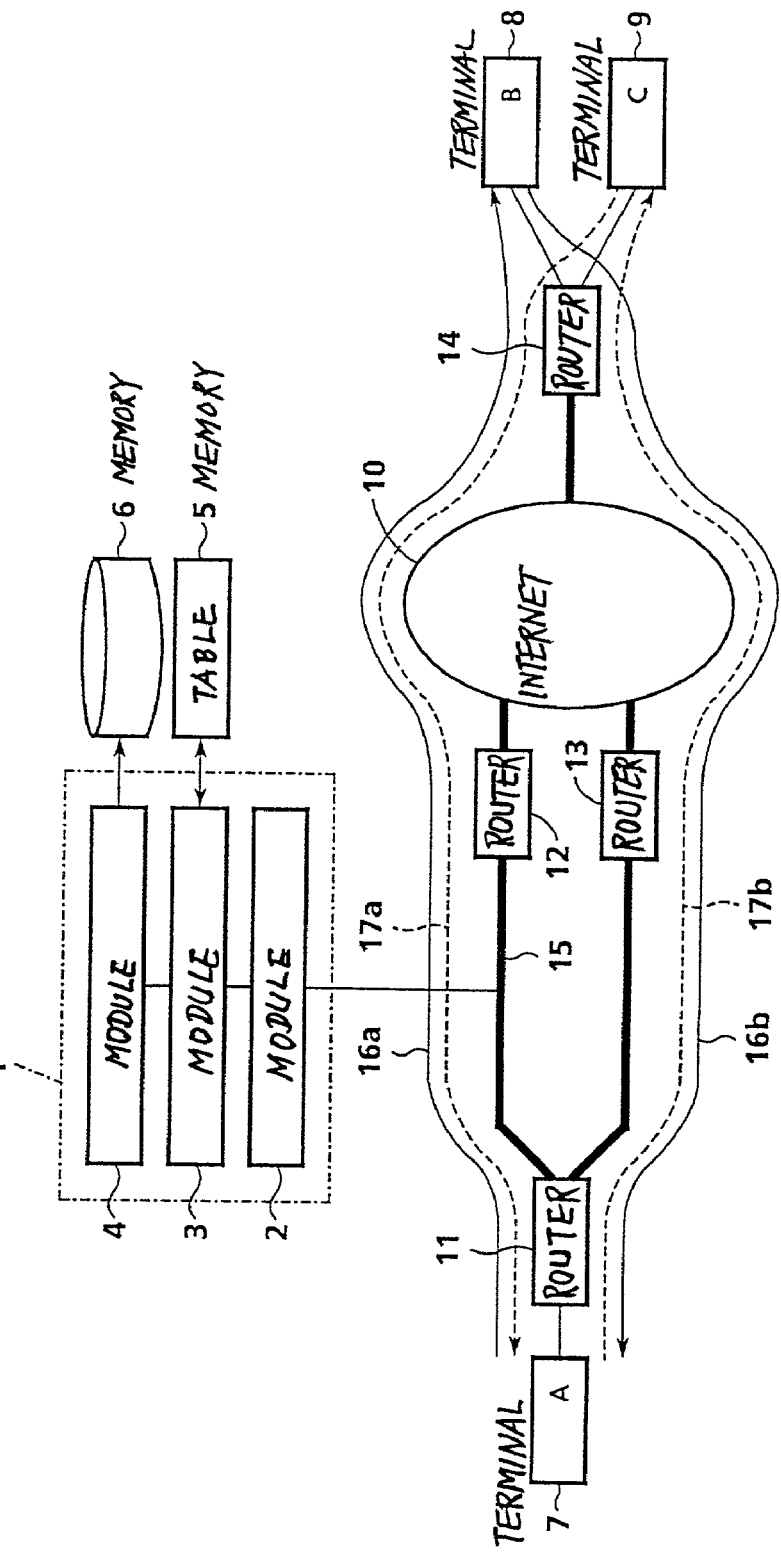
FIG. 1 shows a sample of the apparatus which can collects the statistical traffics in both directions.

Referring to the drawings, embodiments of the present invention will be described.

FIG. 1 shows a configuration of an apparatus, which attains the present invention, for collecting statistical traffic information in both directions. The apparatus 1 shown in FIG. 1 comprises a module 2 for capturing segments, an analysis module 3, a storing module 4, a memory 5 for storing a status transition table and a memory 6 for storing a traffic information or data. The apparatus 1 collects, as a traffic information, a TCP-level information and an application-level information (for example; an HTTP-level information, an FTP-level information) as shown in below list.

(1) List of TCP-Level Information

An amount of transmitted segment from an SYN segment sending side

An amount of transmitted bytes from an SYN segment sending side

An amount of transmitted segment from an SYN+ACK segment sending side

An amount of transmitted bytes from an SYN+ACK segment sending side

An amount of received data (received bytes) at an SYN segment sending side

An amount of received data (received bytes) at an SYN+ACK segment sending side

An amount of re-transmitted segment from an SYN segment sending side

An amount of re-transmitted bytes from an SYN segment sending side

An amount of re-transmitted segment from an SYN+ACK segment sending side

An amount of re-transmitted bytes from an SYN+ACK segment sending side

An amount of missing DATA segment at an SYN segment sending side

An amount of missing DATA segment at an SYN+ACK segment sending side (2) List of HTTP-Level Information A response time at an SYN segment sending side A throughput at an SYN segment sending side A response time at an SYN+ACK segment sending side A throughput at an SYN+ACK segment sending side (3) List of FTP-Level Information
A throughput at an SYN+ACK segment sending side
A throughput at an SYN segment sending side The module 2 is connected with an Internet line 15. For example, the line is a backbone line which composes a part of the Internet. The module 2 captures a segment (called a packet) by monitoring a traffic on the line 15, for example, in a predetermined period, then sends the captured segment to the module 3.

In a network shown in FIG. 1, a terminal(A) 7 is connected with the Internet 10 via two routers 12, 13 which connected with each other, a terminal(B) 8 and a terminal(C) 9 are connected with the Internet 10 via a common router 14, the module 2 is connected with the Internet 10 between the router 11 and the router 12. Accordingly, there are a route via the routers 11 and 12, and a route via the routers 11 and 13 between the terminal(A) 7 and the Internet 10.

In the network shown in FIG. 1, it is assumed that a traffic from the terminal(A) 7 to the terminal(B) 8 flows, as shown by a solid line 16a, via the router 11, the router 12, the Internet 10 and the router 14 successively. It is also assumed that a traffic from the terminal(B) 8 to the terminal(A) 7 flows, as shown by a solid line 16b, via the router 14, the Internet 10, the router 13 and the router 13 successively. In this case, the module 2 can only capture the traffic in one direction shown by the solid line 16a. In other words, the module 2 can not capture the traffic in other direction shown by the solid line 16b.

Further, it is assumed that a traffic from the terminal(C) 7 to the terminal(A) 7 flows, as shown by a dotted line 17a, via the router 14, the Internet 10, the router 12 and the router 11 successively. It is also assumed that a traffic from the terminal(A) 7 to the terminal(C) 9 flows, as shown by a solid line 17b, via the router 11, the router 13, the Internet 10 and the router 14 successively. In this case, the module 2 can only capture the traffic in one direction shown by the dotted line 17a. In other words, the module 2 can not capture the traffic in other direction shown by the solid line 17b.

The module 3 calculates such a statistical traffic information as an amount of the transferred data, based on the segment captured by the module 2.

In the calculation, the module 3 identifies a type of the captured segment by using six flag bits in a TCP header of the captured segment.

A segment of which SYN bit only is "1" is called an SYN segment, and a segment of which SYN bit and ACK bit only are "1" is called an SYN+ACK segment.

A segment of which SYN bit only is "1" among the SYN bit, an FIN bit and the ACK bit, and which has a user data, is called a DATA segment. A segment of which SYN bit only is "1" among the SYN bit, an FIN bit and the ACK bit, but which has not the user data, is called a ACK segment.

Further, the module 3 identifies a connection to which the captured segment belongs, for example, based on an IP address included in the captured segment.

When the captured segment is the DATA segment, the module 3 identifies its sequence number, a user data length and an acknowledgment number. When the captured segment is the ACK segment, the module 3 identifies its acknowledgment number.

Further, the module 3 determines a sequence number [seq_nxt] of a DATA segment to be sent next by referring to the status transition table stored in the memory 5, at every detection of the DATA segment, based on a sequence number of the already detected DATA segment, then the module 3 manages the next sequence number [seq_nxt]. The next sequence number [seq_nxt] is equal to the maximum sequence number which already transferred.

The module 3 determines an acknowledgment [ack_nxt] of an ACK segment to be sent next by referring to the status transition table stored in the memory 5, at every detection of the ACK segment, based on an acknowledgment number of the already detected ACK segment, then the module 3 manages the next sequence number [seq_nxt]. The module 3 also determines a window size [win] of the detected ACK segment having the maximum acknowledgment number by referring to the status transition table stored in the memory 5, at every detection of the ACK segment, based on an acknowledgment number of the detected ACK segment.

The module 4 stores the calculated traffic information from he module 3 in the memory 5. The traffic information is classified by an IP address or a connection or an application.

Examples of the calculation in the module will be explained. It is possible to identify whether a communication is a communication from a client or a communication from a server by identifying whether the captured traffic is a traffic from a side which sent the SYN segment or a traffic from a side which sent the SYN+ACK segment.

[Collection of an Amount of Transmitted Data at the Side which Sent the SYN Segment]

Referring to a sequence chart shown in FIG. 2, an amount of transmitted data from the side which sent the SYN segment will be explained. There are an amount of transmitted segment and an amount of transmitted bytes as the amount of transmitted data. To collect the amount of transmitted data, from a traffic in a direction which can be monitored, the SYN segment is detected, further the DATA segment, which belongs to the same connection as the detected SYN segment is detected.

Figure 2:
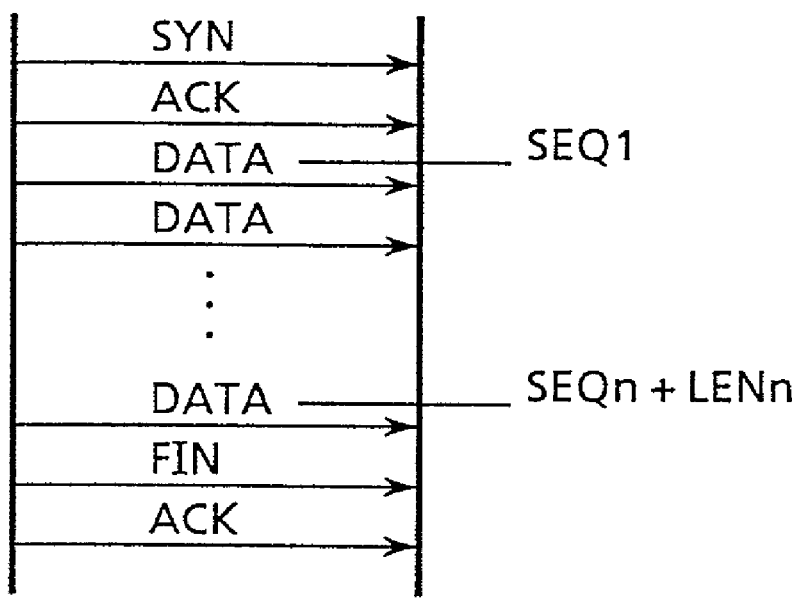
FIG. 2 shows a sample of the sequence chart for collecting the amount of the transmitted data at the side which sends the SYN segment.

As shown in FIG. 2, when the SYN segment is detected in the monitored direction, the amount of transmitted segment, at the side which sent the detected SYN segment, is obtained by counting a total amount of the continuously detected plural DATA segments.

As shown in FIG. 2, when the SYN segment is detected in the monitored direction, the amount [ini_sdt] of transmitted bytes, at the side which sent the detected SYN segment, is obtained by calculating the following equation (1). Wherein, [SEQ1] denotes a sequence number of the first detected DATA segment among the continuously detected plural DATA segments, [SEQn] denotes a sequence number of the last detected DATA segment and [LENn] denotes a user data length of the last detected DATA segment.

$$ini\_sdt=(SEQn+LENn)-SEQ1 \qquad \text{equation (1)}$$

Namely, the amount [ini_sdt] of transmitted bytes is a difference between the sequence number [SEQ1] of the first detected DATA segment, and a sum of the sequence number [SEQn] of the last detected DATA segment and the user data length [LENn] of the last detected DATA segment.

It is possible to calculates only one of the amount of transmitted segment and the amount of transferred bytes.

[Collection of an Amount of Transmitted Data from the Side which Sent the SYN+ACK Segment]

Referring to a sequence chart shown in FIG. 3, an amount of transmitted data at the side which sent the SYN+ACK segment will be explained. There are an amount of transmitted segment and an amount of transmitted bytes as the amount of transmitted data. To collect the amount of transmitted data, from a traffic in a direction which can be monitored, the SYN+ACK segment is detected, further the DATA segment, which belongs to same connection as the detected SYN+ACK segment is detected.

Figure 3:
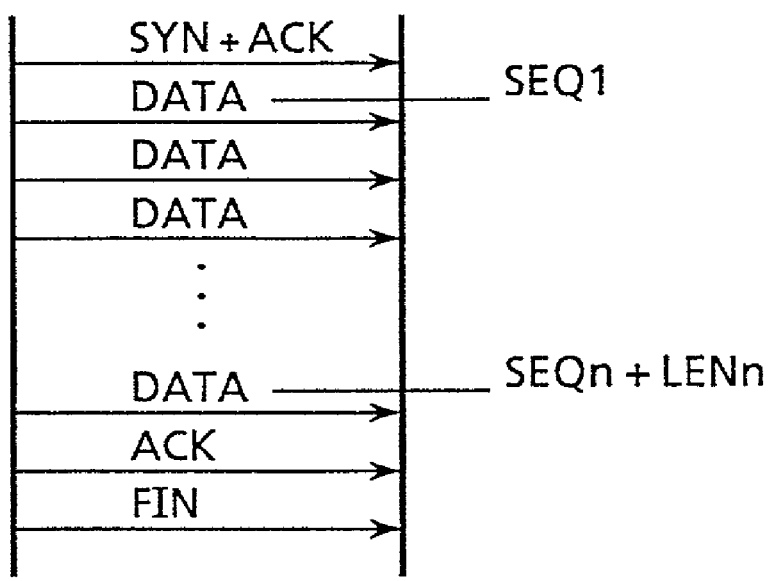
FIG. 3 shows a sample of the sequence chart for collecting the amount of the transmitted data at the side which sends the SYN+ACK segment.

As shown in FIG. 3, when the SYN+ACK segment is detected in the monitored direction, the amount of transmitted segment, at the side which sent the detected SYN+ACK segment, is obtained by counting a total amount of the continuously detected plural DATA segments.

As shown in FIG. 3, when the SYN+ACK segment is detected in the monitored direction, the amount [rsp_sdt] of transmitted bytes, at the side which sent the detected SYN+ACK segment, is obtained by calculating the following equation (2). Wherein, [SEQ1] denotes a sequence number of the first detected DATA segment among the continuously detected plural DATA segments, [SEQn] denotes a sequence number of the last detected DATA segment and [LENn] denotes a user data length of the last detected DATA segment.

$$rsp\_sdt=(SEQn+LENn)-SEQ1 \qquad \text{equation (2)}$$

Namely, the amount [rsp_sdt] of transmitted bytes is a difference between the sequence number [SEQ1] of the first detected DATA segment, and a sum of the sequence number [SEQn] of the last detected DATA segment and the user data length [LENn] of the last detected DATA segment.

It is possible to calculates only one of the amount of transmitted segment and the amount of transferred bytes.

[Collection of an Amount of Received Data at the Side which Sent the SYN Segment]

Referring to a sequence chart shown in FIG. 4, an amount of received data at the side which sent the SYN segment will be explained. To collect the amount of received data, from a traffic in a direction which can be monitored, the SYN segment is detected, further the ACK segment and the DATA segment, all of which belong to same connection as the detected SYN segment is detected.

Figure 4:
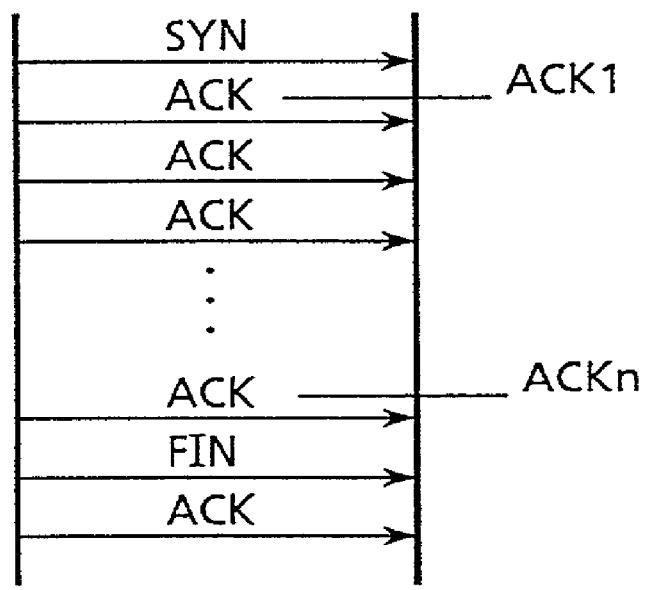
FIG. 4 shows a sample of the sequence chart for collecting the amount of the received data at the side which sends the SYN segment.

As shown in FIG. 4, when the SYN segment is detected in the monitored direction, the amount [ini_rdt] of received bytes, at the side which sent the detected SYN segment, is obtained by calculating the following equation (3). Wherein, [ACK1] denotes an acknowledgment number of the first detected ACK segment or the first detected DATA segment among the continuously detected ACK segment and DATA segment, [ACKn] denotes an acknowledgment number of the last detected ACK segment or the last detected DATA segment.

$$ini\_rdt=ACKn-ACK1 \qquad \text{equation (3)}$$

Namely, the amount [ini_rdt] of received data is a difference between the acknowledgment number [ACK1] of the first detected ACK or DATA segment and the acknowledgment number [ACKn] of the last detected ACK or DATA segment.

[Collection of an Amount of Received Data at the Side which Sent the SYN+ACK Segment]

Referring to a sequence chart shown in FIG. 5, an amount of received data at the side which sent the SYN+ACK segment will be explained. To collect the amount of received data, from a traffic in a direction which can be monitored, the SYN+ACK segment is detected, further the ACK segment and the DATA segment, all of which belong to same connection as the detected SYN+ACK segment is detected.

Figure 5:
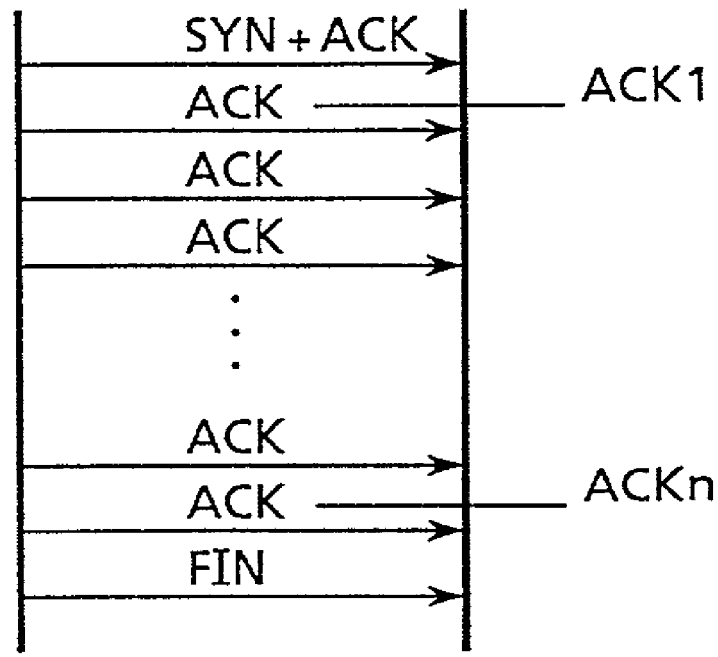
FIG. 5 shows a sample of the sequence chart for collecting the amount of the received data at the side which sends the SYN+ACK segment.

As shown in FIG. 5, when the SYN+ACK segment is detected in the monitored direction, the amount [rsp_rdt] of received bytes, at the side which sent the detected SYN+ACK segment, is obtained by calculating the following equation (4). Wherein, [ACK1] denotes an acknowledgment number of the first detected ACK segment or the first detected DATA segment among the continuously detected ACK segment and DATA segment, [ACKn] denotes an acknowledgment number of the last detected ACK segment or the last detected DATA segment.

$$ini\_rdt=ACKn-ACK1 \qquad \text{equation (4)}$$

Namely, the amount [rsp_rdt] of received data is a difference between the acknowledgment number [ACK1] of the first detected ACK or DATA segment and the acknowledgment number [ACKn] of the last detected ACK or DATA segment.

Next, referring to FIGS. 6(a) and 6(b), a re-transferred amount at the side which sent the SYN segment and a re-transferred amount at the side which sent the SYN+ACK segment will be explained. As the re-transferred amount, there are an amount of a re-transferred segment and an amount of a re-transferred bytes.

[Collection of a Re-Transmitted Amount at the Side which Sent the SYN Segment]

To collect the re-transmitted amount from the side which sent the SYN segment, from a traffic in a direction which can be monitored, the SYN segment is detected. Further, the DATA segment, which belongs to same connection as the detected SYN segment, is detected as shown in FIG. 6(a).

When the DATA segment is detected after the SYN segment in the monitored direction, it is judged whether a sequence number [SEQ] of the newly detected DATA segment is less than the above-mentioned next sequence number [seq_nxt] which was determined at the last DATA segment detection. When the sequence number [SEQ] is less than the next sequence number [seq_nxt], it is judged there was a re-transmission at the side which had sent the SYN segment.

As indicated by following equation (5), the new amount [ini_ret num] of re-transmitted segment is obtained by adding 1 to the last obtained amount of re-transmitted segment.

$$ini\_ret\_num=ini\_ret\_num+1 \qquad \text{equation(5)}$$

Figure 6B:
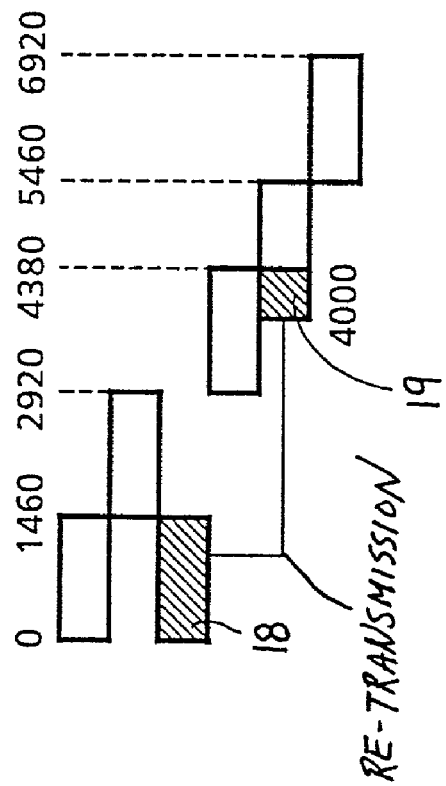
FIG. 6(b) shows a sample of the duplicated bytes.

As indicated by following equation (5), the new amount [ini_ret] of re-transmitted bytes is obtained by adding bytes of a shaded part 18 or a shaded part 19 shown in FIG. 6(b), to the last obtained amount of re-transmitted bytes.

$$ini\_ret=ini\_ret+min(seq\_nxt-SEQ,LEN) \qquad \text{equation(6)}$$

Namely, the amount [ini_ret] is obtained by adding a smaller one out of a first value [seq_nxt]−[SEQ] and a second value [LEN] to the last obtained amount of re-transmitted bytes. The first value [seq nxt]−[SEQ] is a difference between the determined next sequence number [seq_nxt] and a sequence number [SEQ] of the newly detected DATA segment. The second value [LEN] is a user data length of the newly detected DATA segment.

It is possible to calculates only one of the amount of re-transmitted segment and the amount of re-transmitted bytes.

Figure 6A:
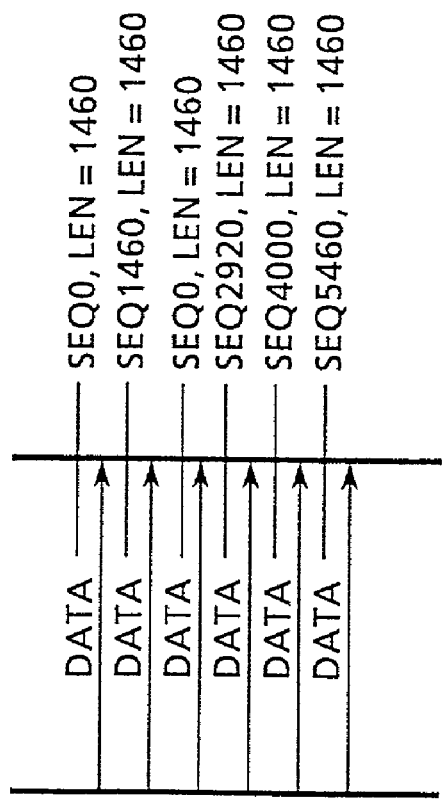
FIG. 6(a) shows a sample of the sequence chart for collecting the amount of the received data.

In FIG. 6(a), when the second DATA segment (SEQ=1460, LEN=1460) was detected, the next sequence number [seq_nxt] is 2920. Then, the re-transmission is judged by detecting the third DATA segment (SEQ=0, LEN=1460). In this case, as [seq_nxt]−[SEQ]=2920 and [LEN]=1460, the shaded part 18 shown in FIG. 6(b) is 1460 bytes. 1460 bytes are detected as the amount of the re-transmitted bytes at the SYN segment sending side.

Further in FIG. 6(a), when the fourth DATA segment (SEQ=2920, LEN=1460) was detected, the next sequence number [seq_nxt] is 4380. Then, the re-transmission is judged by detecting the fifth DATA segment (SEQ=4000, LEN=1460). In this case, as [seq_nxt]−[SEQ]=380 and [LEN]=1460, the shaded part 19 shown in FIG. 6(b) is 380 bytes. 380 bytes are added to the last amount (1460 bytes), then the new amount of re-transmitted bytes becomes 1840 (=1460+380).

[Collection of a Re-Transmitted Amount from the Side which Sent the SYN+ACK Segment]

To collect the re-transmitted amount at the side which sent the SYN+ACK segment, from a traffic in a direction which can be monitored, the SYN+ACK segment is detected. Further, the DATA segment, which belongs to same connection as the detected SYN+ACK segment, is detected as shown in FIG. 6(a).

When the DATA segment is detected after the SYN+ACK segment in the monitored direction, it is judged whether a sequence number [SEQ] of the newly detected DATA segment is less than the above-mentioned next sequence number [seq_nxt] which was determined at the last DATA segment detection. When the sequence number [SEQ] is less than the next sequence number [seq_nxt], it is judged there was a re-transmission at the side which had sent the SYN+ACK segment.

As indicated by following equation (7), the new amount [rsp_ret num] of re-transmitted segment is obtained by adding 1 to the last obtained amount of re-transmitted segment.

$$rsp\_ret\_num = rsp\_ret\_num + 1 \qquad \text{equation (7)}$$

As indicated by following equation (8), the new amount [rsp_ret] of re-transmitted bytes is obtained by adding bytes of a shaded part 18 or a shaded part 19 shown in FIG. 6(b), to the last obtained amount of re-transmitted bytes.

$$rsp\_ret = rsp\_ret + \min(seq\_nxt - SEQ, LEN) \qquad \text{equation (8)}$$

Namely, the amount [rsp_ret] is obtained by adding a smaller one out of a first value [seq_nxt]−[SEQ] and a second value [LEN] to the last obtained amount of re-transmitted bytes. The first value [seq_nxt]−[SEQ] is a difference between the determined next sequence number [seq_nxt] and a sequence number [SEQ] of the newly detected DATA segment. The second value [LEN] is a user data length of the newly detected DATA segment.

It is possible to calculates only one of the amount of re-transmitted segment and the amount of re-transmitted bytes.

Next, referring to FIG. 7, an amount of missing DATA segment at the side which sent the SYN segment and an amount of missing DATA segment at the side which sent the SYN+ACK segment will be explained.

[Collection of an Amount of Missing Data Segment at the Side which Sent the SYN Segment]

To collect the amount of missing DATA segment at the side which sent the SYN segment, from a traffic in a direction which can be monitored, the SYN segment is detected. Further, a new ACK segment, which belongs to same connection as the detected SYN segment, is detected as shown in FIG. 7.

When the new ACK segment is detected after the SYN segment in the monitored direction, an acknowledgment number [ACK] and an window size [WIN] of the newly detected DATA segment are compared with the above-mentioned next acknowledgment number [ack_nxt] and the present window size [win] which were determined at the last ACK segment detection. When both of following equations (9) and (10) are completed, it is judged there was a missing DATA segment at the side which had sent the SYN segment.

$$ACK = ack\_nxt \qquad \text{equation (9)}$$

$$WIN = win \qquad \text{equation (10)}$$

Practically, when both of the equations (9) and (10) are completed two or more times about ACK segments of which sets of the acknowledgment number [ACK] and the window size [WIN] are equal to each other, as indicated following equation (11), the new amount [ini_recv_drop_num] of missing DATA segment, at a side which sent the detected SYN segments, is obtained by adding 1 to the last obtained amount of missing DATA segment.

$$ini\_recv\_drpo\_num = ini\_recv\_drpo\_num + 1 \qquad \text{equation (11)}$$

For above-mentioned calculation, a duplicated ACK flag is introduced in this embodiment. A word "dupack" represents the duplicated ACK flag.

Then, only when a value of the dupack flag is equal to "0" as indicated by following equation (12), it is judged whether both of following equations (13) and (149 are completed. Herein, the equation (13) is equal to the equation (9) and the equation (14) is equal to the equation (10).

$$dupack = \text{"0"} \qquad \text{equation (12)}$$

$$ACK = ack\_nxt \qquad \text{equation (13)}$$

$$WIN = win \qquad \text{equation (14)}$$

Further, only when both of the equations (13) and (14) are completed, as indicated by following equation (15), 1 is added to the last obtained amount [ini_recv_drop] of missing DATA segment. Still further, as shown by following equation (16), the value of the dupack flag is changed to "1". Herein, the equation (13) is equal to the equation (11).

The value of the dupack flag is managed by the module 3, as follows.(1) An initial value of the dupack flag is set "0". (dupack="0")

(2) Under the condition of dupack="0", the value of the dupack flag is changed from "0" to "1", when a next ACK segment, which satisfies both of the equations (13) and (14), is detected. (dupack="1")

(3) Under the condition of dupack="1", the value of the dupack flag is returned from "1" to "0", when a next ACK segment, of which any one of acknowledgment number and window size is different from that of the ACK segment by which the value of the dupack flag was changed from "0" to "1", is detected. (dupack="0")

(4) Under the condition of dupack="1", the value of the dupack flag is not changed from "1", when a next ACK segment, of which both of acknowledgment number and window size is equal to those of the ACK segment by which the value of the dupack flag was changed from "0" to "1", is detected.

As mentioned above, when the SYN segment is detected and the ACK segment, which belongs to same connection as the detected SYN segment, is detected, it is judged whether the acknowledgment number [ACK] and window size [WIN] of the detected ACK segment are respectively equal to the determined next acknowledgment number [ack_nxt] and the determined present window size [win].

At each time when both of the equations (9) and (10) are satisfied by the newly detected two or more ACK segments which have same acknowledgment number and same window size, the new amount [ini_recv_drop_num] of missing DATA segment at the side which sent the detected SYN segments, is obtained by adding 1 to the last obtained amount of missing DATA segment.

Referring a sequence chart shown in FIG. 7, in the first ACK segment, [ACK]=1460, [WIN]=8192. Then, initially, the next acknowledgment number [ack_nxt] is 1460, the present window size [win] is 8192 and the value of the dupack flag is the initial value "0".

Because [ACK]=2920, [WIN]=8192 in the second ACK segment, [ACK] is not equal to [ack_nxt], then, [ack_nxt] is changed to 2920. The value of the dupack flag is not changed from "0".

The second ACK segment and the third DATA segment have the same acknowledgment number [ACK=2920] and the same window size [WIN=8192], further these acknowledgment number [ACK=2920] and window size [WIN=8192] are respectively equal to the determined next acknowledgment number [ack_nxt=2920] and the determined present window size [win=8192]. Then, the amount of the missing DATA segment becomes 1 by adding 1 to the last amount (0) of the missing DATA segment and the value of the dupack flag is changed from "0" to "1", when the third DATA segment is detected.

The second ACK segment and the fourth DATA segment have the same acknowledgment number [ACK=2920] and the same window size [WIN=8192], further these acknowledgment number [ACK=2920] and window size [WIN=8192] are respectively equal to the determined next acknowledgment number [ack_nxt=2920] and the determined present window size [win=8192]. However, because the value of the dupack flag is "1" when the fourth DATA segment is detected, the amount of the missing DATA segment is not increased and the value of the dupack flag is not changed from "1".

The fifth ACK segment has an acknowledgment number [ACK=4380] and an window size [WIN=8192], then the acknowledgment number [ACK=4380] is different from the acknowledgment number [ACK=2920] of the second, third and fourth DATA segment.

Further, when the fourth DATA segment is detected, the determined next acknowledgment number [ack_nxt] is 2920 and the determined present window size [win] is 8192.

Therefore, because [ACK] is not equal to [ack_nxt] when the fifth DATA segment is detected, the next acknowledgment number [ack_nxt] changed to 4380 and the value of the dupack flag is returned to "0".

The fifth ACK segment and the sixth DATA segment have the same acknowledgment number [ACK=4380] and the same window size [WIN=8192], further these acknowledgment number [ACK=4380] and window size [WIN=8192] are respectively equal to the determined next acknowledgment number [ack_nxt=4380] and the determined present window size [win=8192]. Then, the amount of the missing DATA segment becomes 2 by adding 1 to the last amount (1) of the missing DATA segment and the value of the dupack flag is changed from "0" to "1", when the sixth DATA segment is detected.

When the seventh ACK segment and the eighth DATA segment, the amount of the missing DATA segment is not increased. Namely, (1) The fifth ACK segment has an acknowledgment number [ACK=5840] and an window size [WIN=8192], then the acknowledgment number [ACK=5840] is different from the acknowledgment number [ACK=4380] of the sixth DATA segment. Further, when the sixth DATA segment is detected, the determined next acknowledgment number [ack_nxt] is 4380 and the determined present window size [win] is 8192. Therefore, because [ACK] is not equal to [ack_nxt] when the seventh DATA segment is detected, the next acknowledgment number [ack_nxt] changed to 5840 and the value of the dupack flag is returned to "0".

(2) The eighth ACK segment has an acknowledgment number [ACK=5840] and an window size [WIN=16384], then the window size [WIN=16384] is different from the window size [WIN=8192] of the seventh DATA segment.

Further, when the seventh DATA segment is detected, the determined next acknowledgment number [ack_nxt] is 5840 and the determined present window size [win] is 8192. Therefore, because [WIN] is not equal to [win] when the eighth DATA segment is detected, the present window size [win] changed to 16384 and the value of the dupack flag is "0".

[Collection of an Amount of Missing Data Segment at the Side which Sent the SYN+ACK Segment]

To collect the amount of missing DATA segment at the side which sent the SYN+ACK segment, from a traffic in a direction which can be monitored, the SYN+ACK segment is detected. Further, a new ACK segment, which belongs to same connection as the detected SYN+ACK segment, is detected as shown in FIG. 7.

When the new ACK segment is detected after the SYN+ACK segment in the monitored direction, an acknowledgment number [ACK] and an window size [WIN] of the newly detected DATA segment are compared with the above-mentioned next acknowledgment number [ack_nxt] and the present window size [win] which were determined at the last ACK segment detection.

By introducing the dupack flag as mentioned in collecting the amount of missing DATA segment at the side which sent the SYN segment, is judged whether all of following equations (17), (18) and (19) are satisfied.

$$dupack = "0" \qquad \text{equation (17)}$$

$$ACK = ack\_nxt \qquad \text{equation (18)}$$

$$WIN = win \qquad \text{equation (19)}$$

Under the condition of dupack="0" as indicated by the equation (17), when both of the equations (18) and (19) are completed, as indicated following equation (20), the new amount [rsp_recv_drop_num] of missing DATA segment, at a side which sent the detected SYN segments, is obtained by adding 1 to the last obtained amount of missing DATA segment, further the value of the dupack flag is changed from "0" to "1" as indicated following equation (21).

$$rsp\_recv\_drpo\_num = rsp\_recv\_drpo\_num + 1 \qquad \text{equation (20)}$$

$$dupck = "1" \qquad \text{equation (21)}$$

In other words, when the SYN+ACK segment is detected and the ACK segment, which belongs to same connection as the detected SYN+ACK segment, is detected, it is judged whether the acknowledgment number [ACK] and window size [WIN] of the newly detected ACK segment are respectively equal to the determined next acknowledgment number [ack_nxt] and the determined present window size [win].

At each time when both of the equations (18) and (19) are satisfied by the newly detected two or more ACK segments which have same acknowledgment number and same window size, the new amount [rsp_recv_drop_num] of missing DATA segment at the side which sent the detected SYN+ACK segments, is obtained by adding 1 to the last obtained amount of missing DATA segment.

Next, referring to FIGS. 8(*a*) and 8(*b*), an HTTP response time and an HTTP throughput will be explained.

[Description of HTTP Communication]

An HTTP communication is achieved by an HTTP request from a client to a server and an HTTP response from the server to the client. The HTTP request and the HTTP response respectively comprise plural DATA segments. Usually, because the HTTP response includes such a content as a text and an image, a total bytes of the DATA segments of the HTTP response is greater than that of the HTTP request. Further, plural ACK segments are sent from the server and the client respectively corresponding to each group of DATA segments from the client and the server.

[Collection of an HTTP Response Time at a Side which Sent an SYN Segment]

Referring to a sequence chart shown in FIG. 8(a), the HTTP response time and the HTTP throughput at a side which sent the SYN segment will be explained. To collect the HTTP response time and the HTTP throughput, from a traffic in a direction which can be monitored, the SYN segment is detected, further continuous plural DATA segments (HTTP request) and continuous plural ACK segments (HTTP response) in succession to the HTTP request (DATA segments), all of which belong to the same connection as the detected SYN segment, are detected.

The HTTP response time [ini_http_rsp_time], at the side which sent the SYN segment, is obtained by calculating a time difference from the last segment of the HTTP request to the first segment of the HTTP response. A boundary between the HTTP request and the HTTP response is a boundary between the continuous plural DATA segments and the continuous plural ACK segments.

Figure 8A:
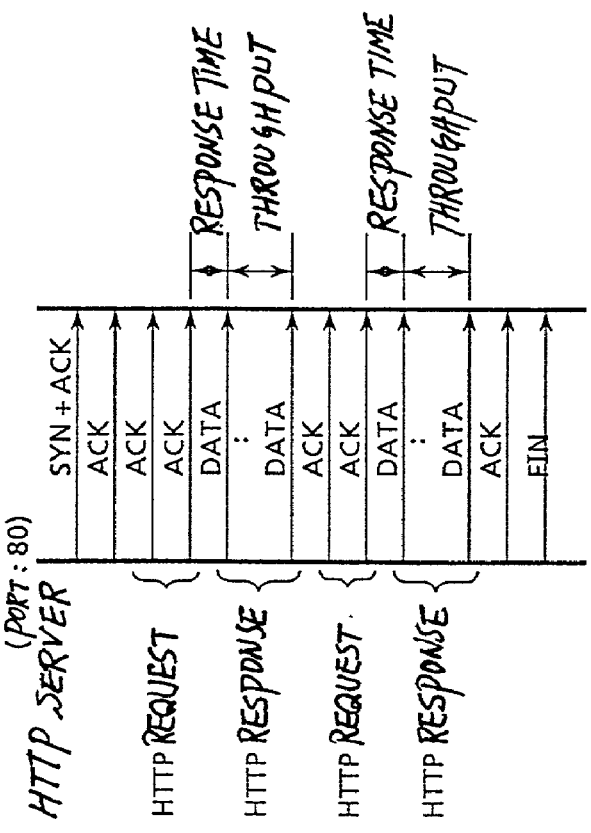
FIG. 8(a) shows a sample of the sequence chart for collecting the HTTP response time and the HTTP throughput.

Therefore as shown in FIG. 8(a), when the SYN segment is detected in the monitored direction, the HTTP response time [ini_http_rsp_time], at the side which sent the detected SYN segment, is obtained by calculating a time difference from the last detection of the DATA segment to the first detection of the ACK segment.

The HTTP throughput [ini_http_tpt], at the side which sent the SYN segment, is obtained by calculating a ratio of an amount of total bytes of the HTTP response to a time difference between a first segment and a last segment of the HTTP response. It is desirable in a precise to obtain an HTTP throughput during the HTTP response, because the total bytes of the DATA segments of the HTTP response is usually greater than that of the HTTP request.

As shown in FIG. 8(a), when the SYN segment is detected in the monitored direction, an amount [http_rsp_byt] of the total bytes of the HTTP response is obtained by calculating a difference between an acknowledgment number of the first detected ACK segment and an acknowledgment number of the last detected ACK segment. Further, a time difference [http_rsp_dtime], from the first segment to the last segment of the HTTP response, is obtained by calculating a time difference from the first detection of the ACK segment to the last detection of the ACK segment.

Further, as indicated in the following equation (22), the HTTP throughput [ini_http_tpt] at the side which sent the SYN segment is obtained by calculating a ratio of the amount [http_rsp_byt] of the total bytes to the time difference [http_rsp_dtime].

$$\text{ini\_http\_tpt} = \text{http\_rsp\_byt}/\text{http\_rsp\_dtime} \qquad \text{equation (22)}$$

In the calculation of the HTTP throughput [ini_http_tpt], it is possible to efficiently avoid an extraordinary amount by calculating the HTTP throughput only when the continuously detected ACK segments than a predetermined quantity such as 10.

It is possible to calculates only one of the HTTP response time and the HTTP throughput. Further, it is possible to obtain the HTTP throughput by calculating a ratio of the amount of the total bytes of the HTTP request, to a time difference between the first segment and the last segment of the HTTP request.

[Collection of an HTTP Response Time at a Side which Sent an SYN+ACK Segment]

Referring to a sequence chart shown in FIG. 8(b), the HTTP response time and the HTTP throughput at a side which sent the SYN+ACK segment will be explained. To collect the HTTP response time and the HTTP throughput, from a traffic in a direction which can be monitored, the SYN+ACK segment is detected, further continuous plural ACK segments (HTTP request) and continuous plural DATA segments (HTTP response) in succession to the HTTP request (ACK segments), all of which belong to the same connection as the detected SYN+ACK segment, are detected.

The HTTP response time [rsp_http_rsp_time], at the side which sent the SYN+ACK segment, is obtained by calculating a time difference from the last segment of the HTTP request to the first segment of the HTTP response. A boundary between the HTTP request and the HTTP response is a boundary between the continuous plural ACK segments and the continuous plural DATA segments.

Figure 8B:
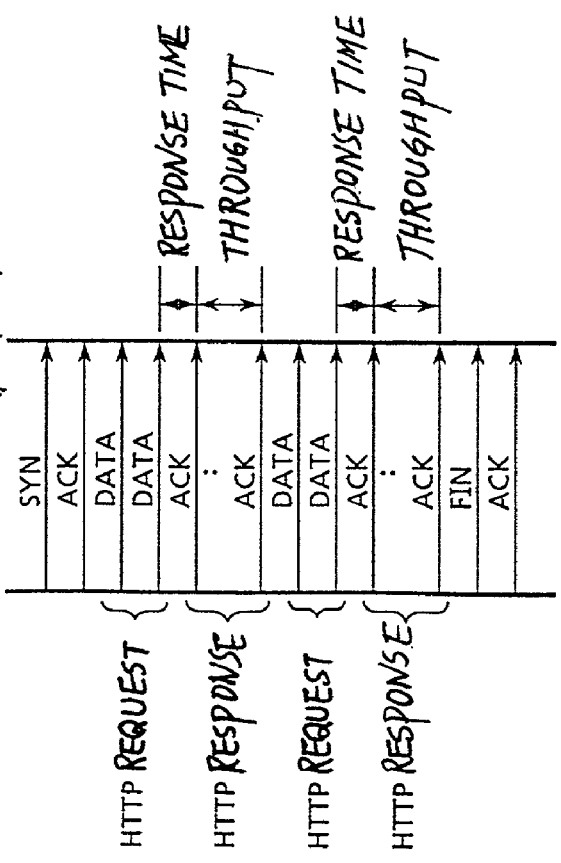
FIG. 8(b) shows a sample of the sequence chart for collecting the HTTP response time and the HTTP throughput.

Therefore as shown in FIG. 8(b), when the SYN+ACK segment is detected in the monitored direction, the HTTP response time [rsp_http rsp_time], at the side which sent the detected SYN+ACK segment, is obtained by calculating a time difference from the last detection of the ACK segment to the first detection of the DATA segment, The HTTP throughput [rsp_http_tpt], at the side which sent the SYN+ACK segment, is obtained by calculating a ratio of an amount of total bytes of the HTTP response to a time difference between a first segment and a last segment of the HTTP response. It is desirable in a precise to obtain an HTTP throughput during the HTTP response, because the total bytes of the DATA segments of the HTTP response is usually greater than that of the HTTP request.

As shown in FIG. 8(b), when the SYN+ACK segment is detected in the monitored direction, an amount [http_rsp_byt] of the total bytes of the HTTP response is obtained by calculating a difference between a sequence number of the first detected DATA segment, and a sum of a sequence number of the last detected DATA segment and a user data length of the last detected DATA segment. Further, a time difference [http_rsp_dtime], from the first segment to the last segment of the HTTP response, is obtained by calculating a time difference from the first detection of the DATA segment to the last detection of the DATA segment.

Further, as indicated in the following equation (23), the HTTP throughput [rsp_http_tpt] at the side which sent the SYN+ACK segment is obtained by calculating a ratio of the amount [http_rsp_byt] of the total bytes to the time difference [http_rsp_dtime].

$$\text{rsp\_http\_tpt} = \text{http\_rsp\_byt}/\text{http\_rsp\_dtime} \qquad \text{equation (23)}$$

In the calculation of the HTTP throughput [rsp_http_tpt], it is possible to efficiently avoid an extraordinary amount by calculating the HTTP throughput only when the continuously detected ACK segments than a predetermined quantity such as 10.

It is possible to calculates only one of the HTTP response time and the HTTP throughput. Further, it is possible to obtain the HTTP throughput by calculating a ratio of the amount of the total bytes of the HTTP request, to a time difference from the first segment to the last segment of the HTTP request.

Next, referring to FIGS. 9(a) and 9(b), an FTP throughput will be explained.

[Description of FTP Communication]

An FTP communication is achieved by a control TCP connection for transmitting control data and a data TCP connection for transmitting a file. In the data TCP connection, because DATA segments may be transmitted in large quantities from a server to a client, it is possible to calculate a throughput. Further, ACK segments are transmitted in large quantities from a server to a client, in response to the large quantity of DATA segments from the server. In the data TCP connection, an SYN segment is sent by the server and an SYN+ACK segment is sent by the client.

[Collection of FTP Throughput at a Side which Sent SYN+ACK segment]

Referring to a sequence chart shown in FIG. 9(a), the FTP throughput at a side which sent the SYN+ACK segment will be explained. To collect the FTP throughput, from a traffic in a direction which can be monitored, the SYN+ACK segment is detected, further continuous plural ACK segments, which belong to the same connection as the detected SYN+ACK segment, are detected.

In the embodiment, the FTP throughput [ini_ftp_tpt], at the side which sent the SYN+ACK segment, is obtained by calculating a ratio of an amount of total bytes of the file to a time difference between a first segment and a last segment in the file transmission.

As shown in FIG. 9(a), when the SYN+ACK segment is detected in the monitored direction, an amount [ftp_byt] of the total bytes of the file is obtained by calculating a difference between an acknowledgment number of the first detected ACK segment and an acknowledgment number of the last detected ACK segment. Further, a time difference [ftp_dtime], from the first segment to the last segment in the file transmission, is obtained by calculating a time difference from the first detection of the ACK segment to the last detection of the ACK segment.

Further, as indicated in the following equation (24), the FTP throughput [ini_ftp_tpt] at the side which sent the SYN+ACK segment is obtained by calculating a ratio of the amount [ftp_byt] of the total bytes to the time difference [ftp_dtime].

$$ini\_ftp\_tpt = ftp\_byt/ftp\_dtime \qquad \text{equation (24)}$$

In the calculation of the FTP throughput [ini_ftp_tpt], it is possible to efficiently avoid an extraordinary amount by calculating the FTP throughput only when the continuously detected ACK segments than a predetermined quantity such as 10.

[Collection of FTP Throughput at a Side which Sent SYN Segment]

Referring to a sequence chart shown in FIG. 9(b), the FTP throughput at a side which sent the SYN segment will be explained. To collect the FTP throughput, from a traffic in a direction which can be monitored, the SYN segment is detected, further continuous plural DATA segments, which belong to the same connection as the detected SYN segment, are detected.

In the embodiment, the FTP throughput [rsp_ftp_tpt], at the side which sent the SYN segment, is obtained by calculating a ratio of an amount of total bytes of the file to a time difference between a first segment and a last segment in the file transmission.

As shown in FIG. 9(b), when the SYN segment is detected in the monitored direction, an amount [ftp_byt] of the total bytes of the file is obtained by calculating a difference between a sequence number of the first detected DATA segment, and a sum of a sequence number of the last detected DATA segment and a user data length of te last detected DATA segment. Further, a time difference [ftp_dtime], from the first segment to the last segment in the file transmission, is obtained by calculating a time difference from the first detection of the DATA segment to the last detection of the DATA segment.

Further, as indicated in the following equation (25), the FTP throughput [rsp_ftp_tpt] at the side which sent the SYN segment is obtained by calculating a ratio of the amount [ftp_byt] of the total bytes to the time difference [ftp_dtime].

$$rsp\_ftp\_tpt = ftp\_byt/ftp\_dtime \qquad \text{equation (25)}$$

In the calculation of the FTP throughput [rsp_ftp_tpt], it is possible to efficiently avoid an extraordinary amount by calculating the FTP throughput only when the continuously detected DATA segments than a predetermined quantity such as 10.

As mentioned-above, it is possible to identify the collected statistical traffic data, based on detecting the SYN segment or the SYN+ACK segment. Namely, it is possible to identify whether a monitored communication is the communication from the server or the communication from the client, based on detecting the SYN segment or the SYN+ACK segment.

[Effect of the Invention]

By the present invention, it is possible to estimate a traffic in a certain direction, where it is impossible to directly capture the traffic, from the opposite direction. Then, a large quantity of the traffic can be collected, and the present invention is useful for searching the traffic in the backbone line connected with the Internet.

What is claimed is:

1. Method for collecting statistical traffic data comprising steps of:

detecting an SYN segment from a traffic in one of two directions on the Internet line;

detecting a DATA segment, which belongs to same connection as the detected SYN segment, from said traffic; and obtaining at least one of an amount of transmitted segment at a side which sent the detected SYN segment, and an amount of transmitted bytes at said side; wherein said amount of transmitted segment being obtained by counting a total amount of said detected DATA segment, and said amount of transmitted bytes being obtained by calculating a difference between a sequence number of the first detected DATA segment, and a sum of a sequence number of the last detected DATA segment and a user data length of said last detected DATA segment.

2. Method for collecting statistical traffic data comprising steps of:

detecting an SYN+ACK segment from a traffic in one of two directions on the Internet line;

detecting a DATA segment, which belongs to same connection as the detected SYN+ACK segment, from said traffic; and obtaining at least one of an amount of transmitted segment at a side which sent the detected SYN+ACK segment, and an amount of transmitted bytes at said side; wherein said amount of transmitted segment being obtained by counting a total amount of said detected DATA segments, and said amount of transmitted bytes being obtained by calculating a difference between a sequence number of the first detected DATA segment, and a sum of a sequence number of the last detected DATA segment and a user data length of said last detected DATA segment.

3. Method for collecting statistical traffic data comprising steps of:
   detecting an SYN segment from a traffic in one of two directions on the Internet line;
   detecting an ACK segment and a DATA segment, each of which belongs to same connection as the detected SYN segment, from said traffic; and
   calculating, as an amount of received data at a side which sent the detected SYN segment, a difference between an acknowledgment number of the first detected ACK segment or DATA segment and an acknowledgement number of the last detected ACK segment or DATA segment.

4. Method for collecting statistical traffic data comprising steps of:
   detecting an SYN+ACK segment from a traffic in one of two directions on the Internet line;
   detecting an ACK segment and a DATA segment, each of which belongs to same connection as the detected SYN+ACK segment, from said traffic; and
   calculating, as an amount of received data at a side which sent the detected SYN+ACK segment, a difference between an acknowledgment number of the first detected ACK segment or DATA segment and an acknowledgement number of the last detected ACK segment or DATA segment.

5. Method for collecting statistical traffic data comprising steps of:
   detecting an SYN segment from a traffic in one of two directions on the Internet line;
   detecting a DATA segment, which belongs to same connection as the detected SYN segment, from said traffic;
   determining a sequence number of a DATA segment to be sent next, at every detection of the DATA segment, based on a sequence number of the detected DATA segment;
   judging, at every detection of the DATA segment, whether a sequence number of the newly detected DATA segment is less than said determined sequence number at the last DATA segment detection; and
   obtaining, when the sequence number of the newly detected DATA segment is less than said determined sequence number, at least one of a new amount of re-transmitted segment at a side which sent the detected SYN segment, and a new amount of re-transmitted bytes at said side; wherein said new amount of re-transmitted segment being obtained by adding 1 to the last obtained amount of re-transmitted segment, and said new amount of re-transmitted bytes being obtained by adding a smaller one out of a first value and a second value to the last obtained amount of re-transmitted segment, wherein the first value being a difference between said determined sequence number and a sequence number of said newly detected DATA segment, and the second value being a user data length of said newly detected DATA segment.

6. Method for collecting statistical traffic data comprising steps of:
   detecting an SYN+ACK segment from a traffic in one of two directions on the Internet line;
   detecting a DATA segment, which belongs to same connection as the detected SYN+ACK segment, from said traffic;
   determining a sequence number of a DATA segment to be sent next, at every detection of the DATA segment, based on a sequence number of the detected DATA segment;
   judging, at every detection of the DATA segment, whether a sequence number of the newly detected DATA segment is less than said determined sequence number at the last DATA segment detection; and
   obtaining, when the sequence number of the newly detected DATA segment is less than said determined sequence number, at least one of a new amount of re-transmitted segment at a side which sent the detected SYN+ACK segment, and a new amount of re-transmitted bytes at said side; wherein said new amount of re-transmitted segment being obtained by adding 1 to the last obtained amount of re-transmitted segment, and said new amount of re-transmitted bytes being obtained by adding a smaller one out of a first value and a second value to the last obtained amount of re-transmitted segment, wherein the first value being a difference between said determined sequence number and a sequence number of said newly detected DATA segment, and the second value being a user data length of said newly detected DATA segment.

7. Method for collecting statistical traffic data comprising steps of:
   detecting an SYN segment from a traffic in one of two directions on the Internet line;
   detecting an ACK segment, which belongs to same connection as the detected SYN segment, from said traffic;
   determining an acknowledgment number of an ACK segment to be sent next and a window size of an ACK segment having the maximum acknowledgment number, at every detection of the ACK segment, based on an acknowledgment number of the detected ACK segment;
   judging, at every detection of the ACK segment, whether both of an acknowledgment number and a window size of the newly detected ACK segment are equal to said determined acknowledgment number and said determined window size at the last ACK segment detection; and
   obtaining, when both of the acknowledgment number and the window size of the newly detected two or more ACK segments are equal to said determined acknowledgment number and said determined window size, a new amount of missing DATA segment at a side which sent the detected SYN segments, by adding 1 to the last obtained amount of missing DATA segment.

8. Method for collecting statistical traffic data comprising steps of:
   detecting an SYN+ACK segment from a traffic in one of two directions on the Internet line;
   detecting an ACK segment, which belongs to same connection as the detected SYN+ACK segment, from said traffic;
   determining an acknowledgment number of an ACK segment to be sent next and a window size of an ACK segment having the maximum acknowledgment number, at every detection of the ACK segment, based on an acknowledgment number of the detected ACK segment;
   judging, at every detection of the ACK segment, whether both of an acknowledgment number and a window size of the newly detected ACK segment are equal to said determined acknowledgment number and said determined window size at the last ACK segment detection; and obtaining, when both of the acknowledgment number and the window size of the newly detected two or more ACK segments are equal to said determined acknowledgment number and said determined window size, a new amount of missing DATA segment at a side which sent the detected SYN+ACK segments, by adding 1 to the last obtained amount of missing DATA segment.

9. Method for collecting statistical traffic data comprising steps of:

detecting an SYN segment from a traffic in one of two directions on the Internet line;

detecting continuous plural DATA segments and continuous plural ACK segments in succession to the DATA segments, all of which belong to same connection as the detected SYN segment, from said traffic; and obtaining at least one of an HTTP response time at a side which sent the detected SYN segment, and an HTTP throughput at said side; wherein said HTTP response time being obtained by calculating a time difference from the last detection of the DATA segment to the first detection of the ACK segment, and said HTTP throughput being obtained by calculating a ratio of a difference, between an acknowledgement number of the first detected ACK segment and an acknowledgement number of the last detected ACK segment, to a time difference from the first detection of the ACK segment to the last detection of the ACK segment.

10. Method for collecting statistical traffic data comprising steps of:

detecting an SYN+ACK segment from a traffic in one of two directions on the Internet line;

detecting continuous plural ACK segments and continuous plural DATA segments in succession to the ACK segments, all of which belong to same connection as the detected SYN+ACK segment, from said traffic; and obtaining at least one of an HTTP response time at a side which sent the detected SYN+ACK segment, and an HTTP throughput at said side; wherein said HTTP response time being obtained by calculating a time difference from the last detection of the ACK segment to the first detection of the DATA segment, and said HTTP throughput being obtained by calculating a ratio of a difference, between a sequence number of the first detected DATA segment and a sum of a sequence number of the last detected DATA segment and a user data length of the last detected DATA segment, to a time difference from the first detection of the DATA segment to the last detection of the DATA segment.

11. Method for collecting statistical traffic data comprising steps of:

detecting an SYN+ACK segment from a traffic in one of two directions on the Internet line;

detecting continuous plural ACK segments, which belong to same connection as the detected SYN+ACK segment, from said traffic; and calculating, as an FTP throughput at a side which sent the detected SYN+ACK segment, a ratio of a difference, between an acknowledgement number of the first detected ACK segment and an acknowledgement number of the last detected ACK segment, to a time difference from the first detection of the ACK segment to the last detection of the ACK segment.

12. Method for collecting statistical traffic data comprising steps of:

detecting an SYN segment from a traffic in one of two directions on the Internet line;

detecting continuous plural DATA segments, which belong to same connection as the detected SYN segment, from said traffic; and calculating, as an FTP throughput at a side which sent the detected SYN segment, a ratio of a difference, between a sequence number of the first detected DATA segment and a sum of a sequence number of the last detected DATA segment and a user data length of the last detected DATA segment, to a time difference from the first detection of the DATA segment to the last detection of the DATA segment.

* * * * *